June 20, 1944.   P. F. SPERRY   2,351,886
FILM ACTUATING MEANS
Filed Nov. 24, 1941   2 Sheets-Sheet 2
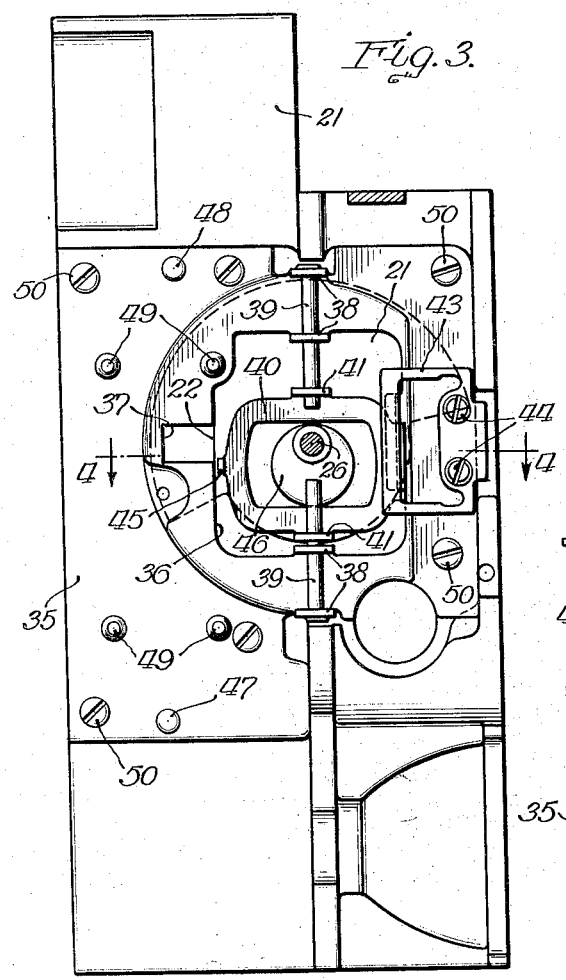
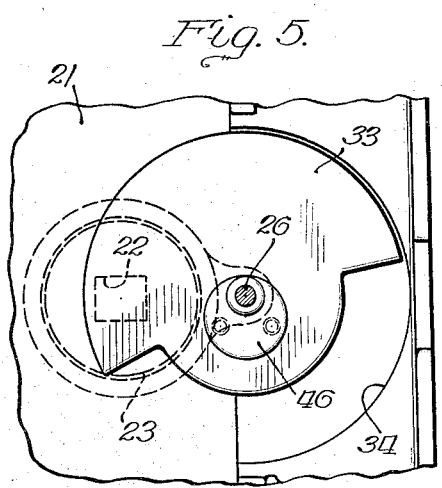
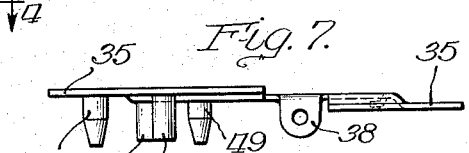
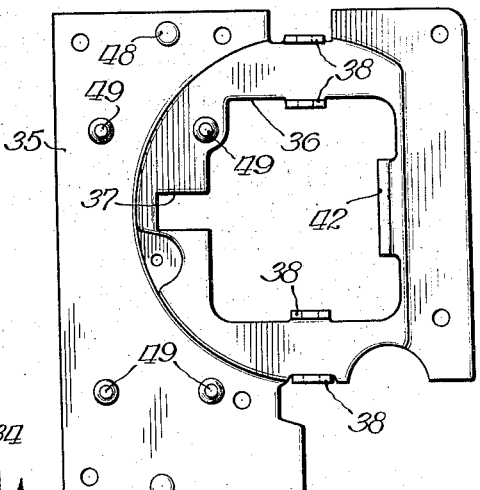
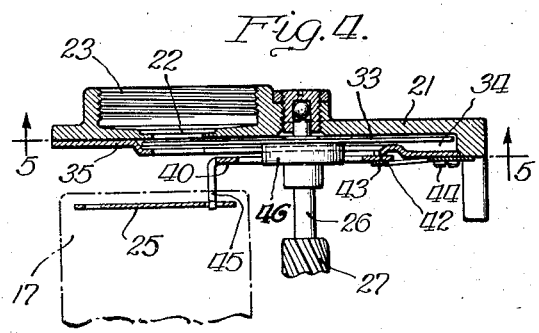
INVENTOR.
Philmore F. Sperry Patented June 20, 1944

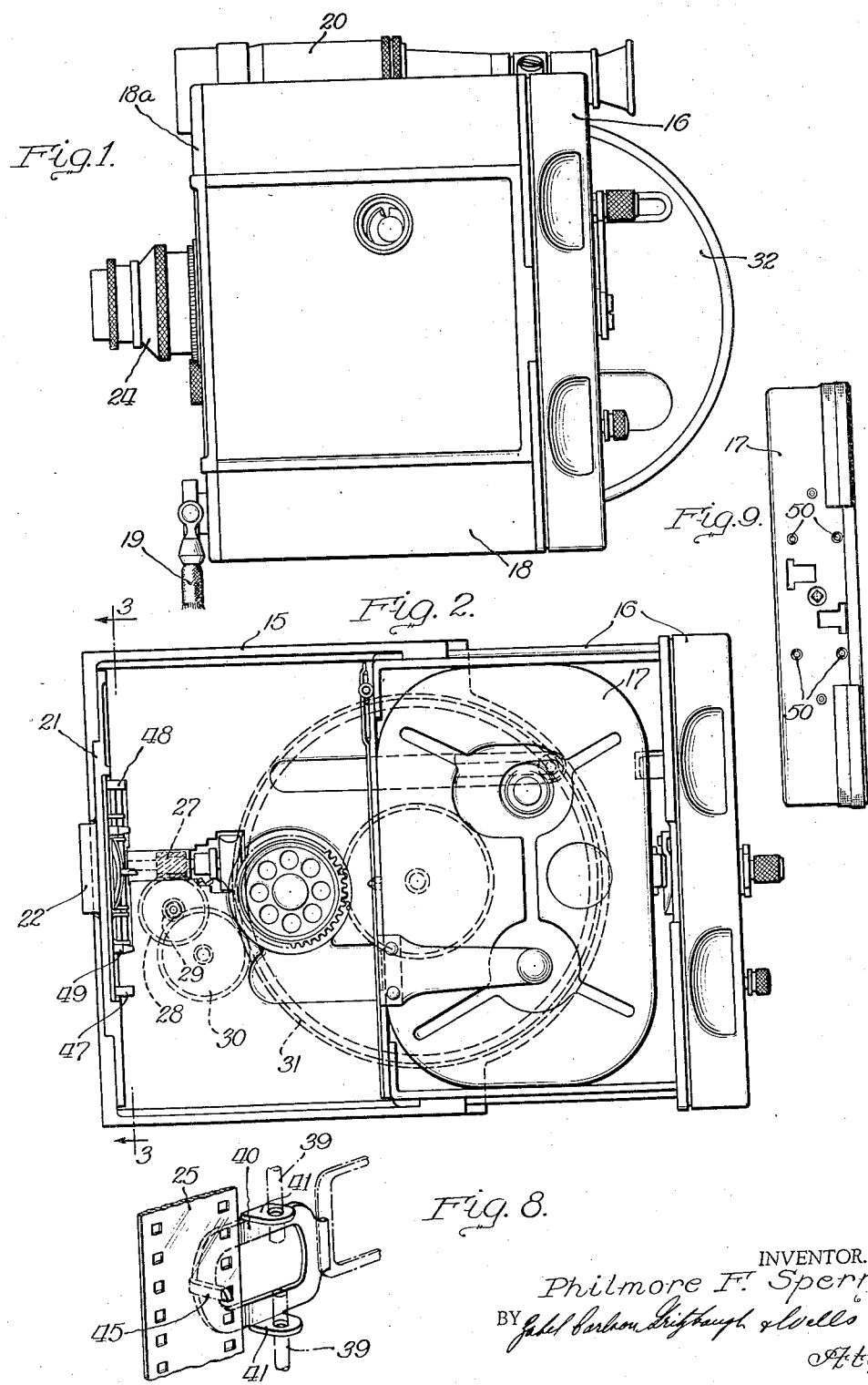

2,351,886

UNITED STATES PATENT OFFICE 2,351,886

FILM ACTUATING MEANS

Philmore F. Sperry, Chicago, Ill.; Helen B. Sperry, executrix of the estate of said Sperry, deceased, assignor to Revere Camera Company, a corporation of Delaware Application November 24, 1941, Serial No. 420,223

7 Claims. (Cl. 88—18.4)

This invention relates to film actuating means and is designed particularly for use in connection with moving picture cameras of the magazine type. It is the object of the invention to provide an improved arrangement of actuating means for a film whereby each frame of the film in turn may be held accurately in the precise position required for the formation of a clear-cut sharp image. It is one of the objects of the invention to provide an arrangement of this type in which the considerable number or controlling and actuating parts are mounted and coordinated so as to afford the best possible access to the working parts and their supporting means for assembly into working relationship. To this end, an effort has been made to arrange the parts in unit form so that the several units can be assembled separately and then brought together to advantage in the final complete structure.

It is one of the objects of this invention to provide a novel form of mounting means for the shuttle by which the film is moved intermittently, arranged so as to permit free and easy movement of the shuttle but so as to insure at the same time that the shuttle shall be at all critical periods in precisely the desired position. For attaining this end, the shuttle has been arranged to slide vertically on oppositely disposed pins carried by a plate removably mounted in position immediately in front of the operative position of the film magazine, such plate being provided with an opening in which the shuttle is movable. A guide is provided in vertical position along one side edge of the opening in the plate, and yielding means also carried by the plate serves to press the shuttle yieldingly against the guide so as normally to hold the shuttle in a definite predetermined position. The removable plate also carries the pins by which the film magazine is held in properly adjusted position wtih respect to the magazine chamber and the pins by which the film engaging parts in the magazine are held in properly adjusted position with respect to the lens system of the camera so as to insure that the films shall be held at precisely the desired distance to the rear of the lens system.

It is another object of this invention to improve devices of this type in sundry details hereinafter pointed out. The preferred means by which the several objects have been attained are illustrated in the accompanying drawings, in which Fig. 1 is a side face view of a camera equipped with the invention;

Fig. 2 is a side view of the camera with the magazine carrier in open position, and with the side and front face plates of the camera casing and the view finder removed;

Fig. 3 is a vertical cross sectional view taken on an enlarged scale at the line 3—3 of Fig. 2;

Fig. 4 is a horizontal sectional view taken substantially at the line 4—4 of Fig. 3;

Fig. 5 is a vertical sectional view taken substantially at the line 5—5 of Fig. 4;

Fig. 6 is a back face view of the removable plate which carries the shuttle and other parts, having a plurality of pins mounted thereon but with many of the parts removed for clearness of illustration;

Fig. 7 is a top edge view of the plate as shown in Fig. 6;

Fig. 8 is a perspective view of the shuttle and fragmentary portions of cooperating parts; and Fig. 9 is a front face view of a portion of a film magazine as used in the camera.

Referring now to the several figures of the drawings, in which corresponding parts are indicated by the same reference characters, 15 indicates a camera casing member in which a magazine carrier 16 in the form of a drawer is slidably mounted for supporting a film magazine 17 of any approved type in operative position within the casing. In Fig. 2, the drawer 16 is shown in retracted position so as to permit of ready insertion of the magazine 17 into position therein. When the carrier or drawer 16 is moved forwardly to operative position, the magazine 17 is moved into operative position in the casing so as to hold the film in the casing at precisely the desired distance from the lens system of the camera as hereinafter described. A side plate 18 serves to close the open face of the drawer 16 when the drawer is pushed forwardly to its operative position. A front facing plate 18a is secured in front of the front flange of the casing member 15, being provided with a loop 19 of any suitable type for carrying the camera. A view finder 20 of any approved type is mounted on top of the casing of the camera at one side thereof.

Immediately to the rear of the front flange of the casing member 15 a front frame plate 21 is rigidly mounted in position, being provided with an exposure opening 22 therethrough at one side portion as is clearly shown in Figs. 3 and 4. The front plate 21 is provided on its front face with a threaded sleeve or collar 23 in centered position about the exposure opening 22 for removably supporting a lens structure 24 of any suitable type.

The means for giving a film 25 carried by the magazine 17 the desired intermittent movement past the exposure opening 22 in the front frame plate 21 comprises a shaft 26 having its front end rotatably mounted in a suitable bearing in the front frame plate 21 (see Fig. 4). The shaft 26 is provided with a worm 27 thereon which is driven by a worm gear 28 which in turn is driven by a pinion 29 and a gear 30 from a large gear 31 to which power is initially applied from a spring motor of any approved type within the motor housing portion 32 of the camera casing.

Upon its front end portion immediately to the rear of the frame plate 21, a shutter 33 is fixedly mounted in position to provide an effective intermittent closure for the exposure opening. In the arrangement shown, the shutter 33 is mounted in a semi-circular recess 34 in the rear face of the front frame plate 31 (see Figs. 4 and 5). Immediately to the rear of the shutter 33, a thin sheet metal plate 35 is removably mounted in position having a large opening 36 therethrough including a portion 37 corresponding with the exposure opening 22 in the frame plate 21.

As is best shown in Fig. 6, the retainer plate 35 is provided with backwardly extending lugs 38 projecting therefrom at the top and bottom edges of the portion of sheet metal forming the middle portion of the plate 35, such lugs being adapted to provide rigid support for inwardly extending pins 39, as is best shown in Fig. 3. Upon the pins 39, a shuttle 40 is slidably mounted by means of lugs 41 engaging the pins so as to cause the shuttle to be reciprocated vertically within the opening 36 in said plate 35. For holding the shuttle 40 in operative position with respect to the plate 35 a guide portion 42 is provided at one side edge of the opening 36, such guide portion being provided by offsetting a narrow portion of the metal of the plate 35, as is best shown in Fig. 4. The guide 42 is arranged in position for engaging the front face of the shuttle 40 so as to hold the shuttle squarely in position transversely as the shuttle is moved upwardly and downwardly upon the pins 39. The shuttle 40 is pressed lightly against the guide 42 by means of a light leaf spring 43 which is secured in position on the plate 35 by means of machine screws 44. The arrangement is such that the shuttle 40 is adapted to move vertically on the pins 39 very smoothly and easily.

Means is provided for actuating the film 25 downwardly in a step by step movement, such means comprising an actuating finger 45 mounted at one side of the shuttle 40 in position to engage the openings in the film within the magazine 17.

As is clearly shown in Fig. 8, the rear end portion of the finger 45 is beveled downwardly and backwardly so as to have effective engagement with the film upon the downward movement of the finger but so as to permit the finger to move upwardly independently of the film for engagement with the next succeeding opening in the film. For expediting this action, the shuttle 40 is adapted to swing very slightly about the pins 39 on the upward movement of the shuttle, such movement being permitted against the action of the light spring 43. The vertical movement of the shuttle is brought about by the engagement of an eccentric 46 with the top and bottom cross bar portions of the shuttle, such eccentric 46 being fixedly mounted upon the shaft 26 so as to rotate therewith.

The removable plate 35 is also provided with means for positioning the magazine 17 accurately in the camera and for positioning the film 25 accurately within the magazine for holding it at precisely the desired position with respect to the lens structure 24. For effecting these results, the plate 35 is provided with backwardly extending pins 47 and 48 in position to engage the front face of the magazine 17 for limiting the forward movement of the magazine in the camera. Tapered pins 49 are also provided extending backwardly from the rear face of the plate 35 in position for engagement with pins 50 carried by the film engaging parts within the film magazine 17. The pins 49 serve both to limit the forward movement of the film within the camera and also to cause the film to be squared into precisely transverse position with respect to the lens system so as to insure that the film shall be in precisely the desired position for producing a clear-cut image on the film.

By the improved arrangement as above described, the manufacturer is enabled to position the shuttle 40 accurately upon the plate 35 in the desired operative relation to the pins 47, 48 and 49. The plate 35 and the cooperating parts as shown in Fig. 3 are all assembled in unit form with the least possible trouble, since ready access is provided to all of the parts. The plate 35 is then secured in position upon the front plate 21 by means of machine screws 50 so as to hold all of the critically positioned element in their desired operative position.

While the arrangement as shown and described is preferred, the invention is not to be limited to such construction except so far as the claims may be so limited, it being understood that changes might well be made in the form and arrangement of the parts without departing from the spirit of the invention.

What is claimed is:

1. In a moving picture camera, the combination of a front frame plate having an exposure opening therethrough, a second plate removably secured on the rear face of said front plate in contact with the front plate and having a large opening therethrough, a shaft rotatably mounted in a bearing in said front plate, a shutter mounted on said shaft between said two plates adapted upon rotation with said shaft to cause an intermittent effective closure of said exposure opening, a shuttle, means for slidably mounting said shuttle in said large opening in said second plate so as to be supported by said second plate and so as to provide for vertical movements of the shuttle, eccentric driving means on said shaft adapted by engagement with said shuttle to give it a reciprocatory movement upwardly and downwardly, and means for driving said shaft.

2. In a moving picture camera, the combination of a front frame plate having an exposure opening therethrough, a second plate removably secured on the rear face of said front plate and having a large opening therethrough, a shaft rotatably mounted in a bearing in said front plate, a shutter mounted on said shaft between said two plates adapted upon rotation with said shaft to cause an intermittent effective closure of said exposure opening, pins fixedly mounted on said second plate extending inwardly from the top and bottom edges of said large opening, a shuttle slidable vertically on said pins in said large opening in the second plate and free at all times to swing slightly about said pins, means on said shaft for reciprocating said shuttle upwardly and downwardly in said opening, and means for driving said shaft.

3. In a moving picture camera, the combination of a front frame plate in the form of a casting having an exposure opening therethrough at one side portion thereof, means at the front face of the plate for securing a lens in position in front of said exposure opening, a second plate formed of sheet metal removably secured on the rear face on said front plate and having a large opening therethrough, a shaft rotatably mounted in a bearing in said front plate, a shutter mounted on said shaft between said two plates adapted upon rotation with said shaft to cause an intermittent effective closure of said closure opening, lugs bent backwardly at the edge portions of the metal of said second plate, pins fixedly mounted in said lugs extending vertically into said large opening, a shuttle slidable vertically on said pins in said large opening, means on said shaft for reciprocating said shuttle on said pins, and means for driving said shaft.

4. In a moving picture camera, the combination of a front frame plate having an exposure opening therethrough, a second plate removably secured on the rear face of said front plate and having a large opening therethrough, a shaft rotatably mounted in a bearing in said front plate, a shutter mounted on said shaft between said two plates adapted upon rotation with said shaft to cause an intermittent effective closure of said exposure opening, a shuttle, means for slidably mounting said shuttle in said opening in said second plate so as to provide for vertical movements of the shuttle, a guide on said second plate along which said shuttle moves, spring means on said second plate for pressing said shuttle lightly against said guide, means on said shaft for reciprocating said shuttle upwardly and downwardly, and means for driving said shaft.

5. In a moving picture camera, the combination of a front frame plate having an exposure opening therethrough, a second plate removably secured on the rear face of said front plate and having a large opening therethrough, a shaft rotatably mounted in a bearing in said front plate, a shutter mounted on said shaft between said two plates adapted upon rotation with said shaft to cause an intermittent effective closure of said exposure opening, a shuttle, means for slidably mounting said shuttle in said large opening in said second plate so as to provide for vertical movements of the shuttle, a guide on said second plate along which said shuttle will move, a light leaf spring spaced backwardly from said second plate at one side edge so as to engage said shuttle for pressing it lightly against said guide, means on said shaft for reciprocating said shuttle upwardly and downwardly on said pins, and means for driving said shaft.

6. In a moving picture camera, the combination of a front frame plate in the form of a casting having an exposure opening therethrough at one side portion thereof, means at the front face of the plate for securing a lens in position in front of said exposure opening, a second plate formed of sheet metal removably secured on the rear face on said front plate and having a large opening therethrough, a shaft rotatably mounted in a bearing in said front plate, a shutter mounted on said shaft between said two plates adapted upon rotation with said shaft to cause an intermittent effective closure of said closure opening, lugs bent backwardly at the edge portions of the metal of said second plate, pins fixedly mounted in said lugs extending vertically into said large opening, a shuttle slidable vertically on said pins in said large opening, a narrow guide along the side edge of said large opening provided by offsetting the sheet metal of said second plate for providing a sliding bearing for said shuttle, a flat spring on said second plate engaging said shuttle for pressing it lightly against said guide, means on said shaft for reciprocating said shuttle upwardly and downwardly on said pins, and means for driving said shaft.

7. In a moving picture camera of the magazine type, the combination of a front frame plate having an exposure opening therethrough, a second plate removably secured on the rear face of said front plate and having a large opening therethrough, a shaft rotatably mounted in a bearing carried by said front plate, a shutter mounted on said shaft between said two plates adapted upon rotation with said shaft to cause an intermittent effective closure of said exposure opening, means for driving said shaft and shutter, means on said second plate adapted by engagement with a magazine to position the magazine accurately in operative position in the camera, and means on said second plate adapted by engagement with cooperating means in the magazine to position the film accurately in operative position.

PHILMORE F. SPERRY.